United States Patent [19]

Wirstrom et al.

[11] Patent Number: 4,694,492
[45] Date of Patent: Sep. 15, 1987

[54] COMPUTER COMMUNICATIONS SECURITY CONTROL SYSTEM

[75] Inventors: Peter Wirstrom, Pepper Pike, Ohio; William H. Cork, Lake Bluff, Ill.

[73] Assignee: Pirmasafe, Inc., Cleveland, Ohio

[21] Appl. No.: 670,471

[22] Filed: Nov. 9, 1984

[51] Int. Cl.$^4$ .............................................. H04L 9/00
[52] U.S. Cl. .................................. 380/23; 380/25/47
[58] Field of Search ............... 178/22.08, 22.09, 22.16; 235/379, 380, 382, 382.5, 487; 340/825.31, 825.34; 380/23, 24, 25, 47

[56] References Cited

U.S. PATENT DOCUMENTS

| | | | |
|---|---|---|---|
| 3,764,742 | 10/1973 | Abbott et al. | 178/22.08 |
| 3,800,284 | 3/1974 | Zucker et al. | 340/825.31 |
| 4,145,568 | 3/1979 | Ehrat | 178/22.08 |
| 4,207,555 | 6/1980 | Trombly | 235/382.5 |
| 4,277,837 | 7/1981 | Stuckert | 235/380 |
| 4,288,659 | 9/1981 | Atalla | 235/382 |
| 4,295,039 | 10/1981 | Stuckert | 235/380 |
| 4,295,041 | 10/1981 | Ugon | 235/487 |
| 4,302,810 | 11/1981 | Bouricius et al. | 178/22.16 |
| 4,310,720 | 1/1982 | Check, Jr. | 235/382 |
| 4,408,119 | 10/1983 | Decavele | 235/380 |
| 4,454,414 | 6/1984 | Benton | 235/380 |
| 4,471,216 | 9/1981 | Herve | 235/380 |
| 4,475,175 | 10/1984 | Smith | 364/900 |
| 4,523,087 | 6/1985 | Benton | 235/380 |

OTHER PUBLICATIONS

"The 60 Second Password", by Security Dynamics, Jan. 1984.
Codercard, "Who's Out to Get Your Computer?," 4 pages, date unknown, but 3 of the 4 pages have 1984 printed at the top.
Codercard, "Who's Out to Get Your Computer?," 7 pages, date unknown.
Codercard, "1984 Annual Report," 12 pages, date unknown.
Cytrol, Inc., "Cylock PC Access and Data Protections," 2 pages, has 1984 copyright date.
MicroFrame, Inc., "New Magnakey," 2 pages, date unknown.
Analytics Communications Systems, "Sherlock Information Security System," 6 pages, is believed to bear a date of 3/84.
Remote Systems, Inc., "Shut Down Electronic Piracy," 4 pages, date unknown.

*Primary Examiner*—Salvatore Cangialosi
*Assistant Examiner*—Aaron J. Lewis
*Attorney, Agent, or Firm*—David A. Burge

[57] ABSTRACT

A computer communications control system is provided for authenticating the authorization of a user of computer equipment such as a terminal of a computer network, more specifically communicating data terminal equipment that is connected through a communications link to other computer equipment such as a host computer. The system utilizes a security unit that is associated with and connected to the user's terminal. The security unit operates in conjunction with the other computer equipment to which the user's terminal is linked, for example a host computer, to check the authorization of the user to access the host computer by requiring that an encryption device which has been assigned to the user be received in a port that is defined by the security unit in order that the security unit can respond properly to query signals which are sent along the communications link from the host computer. In the absence of a proper authenticating signal from a terminal's security unit, the host computer denies the terminal's requested access. The security unit and the user's encryption device operate in synchronization with the host computer such that each new authentication query signal that is sent from the host computer will be answered by an appropriate, newly calculated authenticating signal that the host computer checks for correctness of calculation. A feature of the invention resides in requiring that each newly requested authenticating signal differ in a calculated manner from the user's previously sent authenticating signal, with the manner in which sequential authenticating signals differ being determined, at least in part, by the unique character of th user's encryption device.

28 Claims, 2 Drawing Figures

COMPUTER COMMUNICATIONS SECURITY CONTROL SYSTEM

CROSS-REFERENCE TO RELATED APPLICATION

Reference is made to an application entitled INTERACTIVE SECURITY CONTROL SYSTEM FOR COMPUTER COMMUNICATIONS AND THE LIKE, Ser. No. 670,326, filed Nov. 8, 1984 by Peter Wirstrom and William H. Cork.

BACKGROUND OF THE INVENTION

1. Field of the Invention

The present invention relates to a computer communications security control system for identifying authorized users who seek access to a host computer, for establishing and maintaining a communications link between a terminal of a computer network and a host computer with assurance being provided that the terminal is being operated by an authorized user of the host computer, and for preventing unauthorized access to the host computer even if an unauthorized user succeeds in duplicating an authenticating signal that has been used previously by an authorized user to gain or maintain access to the host computer. In a broader sense, the present invention relates to the field of electronic communication, and provides methods for identifying and checking the authority of users of remotely located electronic communications equipment such as remote terminals of a computer network, and for assuring that one or more users of remote terminals of a communications network such as linked terminals of a computer equipment network are duly authorized and/or properly identified so that improper use of the equipment is prevented.

2. Prior Art

The problem of controlling access by communicating data terminal equipment to a host computer, or to selected programs and/or data stored by a host computer, so that access can be established and maintained by duly authorized personnel only has become of increasing concern. Moreover, the problem of limiting computer equipment access to duly authorized users has two important objectives that must be taken into account in formulating a suitable solution. While one objective is to establish a system of barriers and obstacles that cannot be traversed or circumvented by unauthorized users, an equally important objective is to assure that such barriers and obstacles as are provided to safeguard against unauthorized access do not unduly hinder either the establishing or maintaining of appropriate access by duly authorized users.

As the number of communicating terminals including personal and business computers has proliferated to the point that communicating data terminal equipment is now readily available, there has been a corresponding increase in the number of persons who have sought to gain unauthorized access to computer equipment such as host computers. Persons who have attempted to gain unauthorized access to host computers have included (1) those who seek access for such illegal purposes as making use of the capabilities of such equipment or for gaining access to and/or manipulating confidential information and/or stored data, and (2) a substantial number of clever people who have taken up the challenge of breaking through computer security systems as something of a fashionable pastime or game wherein they pit their skills and mental acumen against such barriers and obstacles as have been set up by computer security specialists. As users of personal and business computers and other communicating data terminal equipment have become increasingly knowledgeable about such conventional security precautions as passwords and security oriented log-on sequences, the need has become even more paramount for improved methods and apparatus that will serve to properly limit host computer access to duly authorized users without unduly complicating efforts by authorized users to establish and maintain host computer access.

The approach that continues to be utilized most commonly in efforts to control access to such communicating computer equipment as host computers is to require that authorized users transmit a "password," i.e., a purportedly "secret" signal string that is known to the authorized user but not to others, and that is recognized by the host computer as constituting its authorization to permit a predetermined degree of access between the authorized user's terminal and the host computer's facilities and stored data. However, the approach of using one or more passwords as the principal barrier to block unauthorized access has been found to provide only a minimal degree of security inasmuch as authorized users sometimes share their "secret" passwords with colleagues, or the passwords are inadvertently disclosed, discovered, or "broken."

Another approach that has been taken to enhance security between communicating data terminal equipment and a host computer is to provide a "call-back" accessing sequence that must be executed in order for an authorized user to log onto a host computer. In accordance with this practice, the user first establishes communication with a host computer by calling a telephone number that connects with the host. Once the user has successfully completed a first phase of a prescribed log-on procedure, the host computer terminates the original communication link, and then re-establishes communication with the user by placing a separate telephone call to the user at a telephone number where the authorized user is thought to be accessible. The user who has been called by the host computer is then required to complete a second phase of the prescribed log-on procedure.

The call-back approach for logging onto a host computer is often cumbersome to execute, is subject to error that may delay or prevent an authorized user from successfully establishing a needed computer communications link, and requires that an authorized user be stationed at a predetermined location in order to receive the host computer's return call. The requirement of the call-back approach for the host to place a return call to a predetermined telephone number prevents an authorized user from establishing communication with a host computer from such communicating data terminal equipment as may be accessible to the authorized user at locations that are not served by the user's pre-assigned call-back telephone number; thus an authorized user must limit his communications with the host computer to occasions when his schedule brings him to one or a limited number of specific terminals and/or terminal locations. A further problem with the call-back approach is that it is not applicable for use with hard wired networks, or with switchboards, or with networks that include leased lines to which no telephone numbers are assigned. Still further, the security provided by the call-back approach can be defeated through the use of call-forwarding services that are now provided on many telephone exchanges in the United States.

Another proposal that has been made to enhance the security of terminal to host computer communications utilizes installations of hardware in the form of an "accessor" unit that is provided in association with a user's terminal, and a "controller" that is provided in association with a host computer. This proposal is presented in U.S. Pat. No. 4,475,175 issued Oct. 2, 1984, to James G. Smith, the disclosure of which is incorporated herein by reference for its illustration of a typical arrangement of commercially available electrical circuit components that can be utilized to monitor signals being transmitted along a communications link, to store signal string sequences, to transmit stored signal string sequences in response to query signals, to compare signal string sequences that have been transmitted along a communications link to check for propriety, and to take action such as terminating a communications link if a comparison of a received signal string sequence differs from what is deemed to comprise an authorized value.

While the proposal of the Smith patent provides for the use of a dialog between communications equipment at opposite ends of a communications link, with the character of the dialog being essentially transparent to (i.e., unobserved by) the users of the equipment, the proposal does not address the need to assure that the users of linked communications terminals are authorized persons. Rather, the proposal of the Smith patent continues to rely on the use of passwords and/or security oriented log-on sequences to identify users and verify their authority to use linked communications equipment. Rather than to free authorized users to access host computer equipment through the use of a large number of terminals, the Smith proposal is intended for "restricting the number of places from which access can be accomplished." Moreover, because the hardware utilized in implementing the Smith proposal remains in place in an entirely operable state once installed, there are no controlling or key elements that remain within the safeguarded custody of authorized users that must be present for a terminal of the Smith proposal to be utilized, whereby, in the absence of an authorized user, terminals of the Smith system can be used quite readily by operators who are not authorized users.

While still other proposals have been made for various types of highly technical and expensive methods and apparatus for authenticating the authority of a user of various types of remote communications equipment that is networked or otherwise "linked," the need remains for a versatile, reliable system that will limit communications equipment access to authorized personnel, and that will serve to identify and/or verify the authorization of such persons as seek to use the equipment. While voice print, fingerprint and retinal pattern recognition systems have been proposed to enhance computer security, such proposals are unduly complex and expensive, and are impractical to implement for widespread day to day use by authorized users who need a capability to readily establish communications links with host computers through such data terminal equipment as may be available to them regardless of their locations.

SUMMARY OF THE INVENTION

The present invention addresses and overcomes the foregoing and other drawbacks of the prior art by providing a novel and improved communications security system that enables authorized users of communications equipment to readily identify themselves and/or to establish their authority to use and/or access such equipment. The system of the present invention can be utilized, for example, to enable authorized users to identify themselves to and/or to establish their authorization to access a host computer regardless of the location of the data terminal equipment they employ to establish such access. Moreover, the system of the present invention provides an ever changing, constantly renewed means of identifying and authenticating a user's authorization so that an unauthorized user cannot establish his authorization or gain the access that is sought simply by duplicating a signal string that has been used previously by an authorized user. Still further, the system of the present invention may be employed to prevent unauthorized users from gaining host computer access while, at the same time, doing practically nothing to encumber, complicate or interrupt efforts by authorized users to access and communicate with a host computer. Additionally, the system of the present invention preferably operates in a manner that is "transparent" to the user, both in the sense that the user need not participate in its operation by remembering, entering and/or executing log-on sequences or passwords, and in the sense that the nature of the procedures that are executed by the system to check and recheck the user's identification and authorization is normally neither observed nor monitored by the user.

In accordance with the preferred practice of the present invention, such data terminal equipment installations as are to be utilized by one or more authorized users to communicate with a host computer are each provided with a device that will be referred to herein as a "security unit." Each of the security units is associated with and connected to a separate terminal that may be utilized by authorized users. Each security unit is coupled in series with portions of a communications link through which its associated terminal communicates with a host computer. Each authorized user is provided with a unique component or unit that will be referred to herein as an "encryption device." Each encryption device is carried by its authorized user as he or she moves from one location to another. The security units are each provided with a port to receive the encryption devices, and the encryption devices are configured to be removably received in these ports. In preferred practice, the encoded devices that are carried by authorized users each take the form of relatively small cassettes or other small card or cartridge-like, pocket-size structures that are receivable in the ports which are defined by the security units.

With the above-described arrangement of terminal-connected security units and user-assigned encryption devices, the system functions to authenticate a terminal user's authorization by requiring that the user's encryption device be received in the associated security unit's port so that the associated security unit can respond properly to query signals that are sent along the communications link from the host computer. Unless a terminal user's encryption device is received in the port of the associated security unit, the security unit cannot generate such authenticating signals as are needed in order to respond properly to the authentication query signals. Absent a proper response to a query signal, host computer access will be denied or terminated.

A feature of the preferred practice of the invention lies in requiring that each authenticating signal which is sent in response to each new query signal must differ in a predetermined manner from the user's previous authenticating signal, with the manner in which sequential authenticating signals differ being determined at least in part by the unique encryption of the user's encryption device. Stated in another way, a feature of the preferred practice of the invention lies in causing calculations of the values of new authenticating signals to be made in a synchronized manner both at the user's terminal (i.e., in conjunction with use of the user's encryption device) and at the host computer, so that the user's encryption device operating in conjunction with an associated security unit at the user's terminal can respond in a new but proper manner to each new query signal that is issued by the host computer. The system serves to deny host computer access if any authentication query signal that has been transmitted by a host computer is not answered by a proper new authenticating signal.

The security units include electrical circuitry that monitors such signals as are sent along the communications link, detects authentication query signals being sent from a host computer, and causes a suitable authenticating response signal to be sent back along the communications link to the host. The host computer has resident within it a program that calls for the sending query signals to the security unit. Because the security unit, when coupled with the user's encryption device, operates to automatically send authenticating signals in response to query signals received from the host computer, no passwords or other security oriented log-on sequences need be used to establish the authority of a user to access a host computer. The authorized user need learn no passwords, and the manner of operation of the computer communications security system is entirely "transparent" to the user.

The system of the invention preferably operates in such a manner that each time an authenticating response signal is summoned from a security unit by the issuance of an authentication query signal from the host computer, the security unit and the user's encryption device cooperate to determine a valid new authenticating signal that differs in a predetermined manner from the user's last valid authenticating signal which was sent to the host computer. The manner in which consecutive authenticating signals differ is determined at least in part by the unique character of the user's encryption device. The unique character of the user's encryption device is also known to the host computer and is taken into account by the host computer in determining the character of each new authenticating signal that it expects to receive in response to each newly issued query signal. By this arrangement, the manner in which authenticating signals are calculated is not disclosed by any of the signal transmissions that pass along the communications link, whereby unauthorized users cannot learn how to calculate the next valid authenticating signal by monitoring signal transmissions. Nor can unauthorized users gain access to the host computer by duplicating a previously used response to an authentication query, for once an authenticating signal has been sent in response to an authentication query signal, that specific authenticating signal will no longer be accepted as valid by the host computer.

BRIEF DESCRIPTION OF THE DRAWINGS

These and other features and a fuller understanding of the invention may be had by referring to the description and claims that follow, taken in conjunction with the accompanying drawings wherein:

DESCRIPTION OF THE PREFERRED EMBODIMENT

Figure 1:
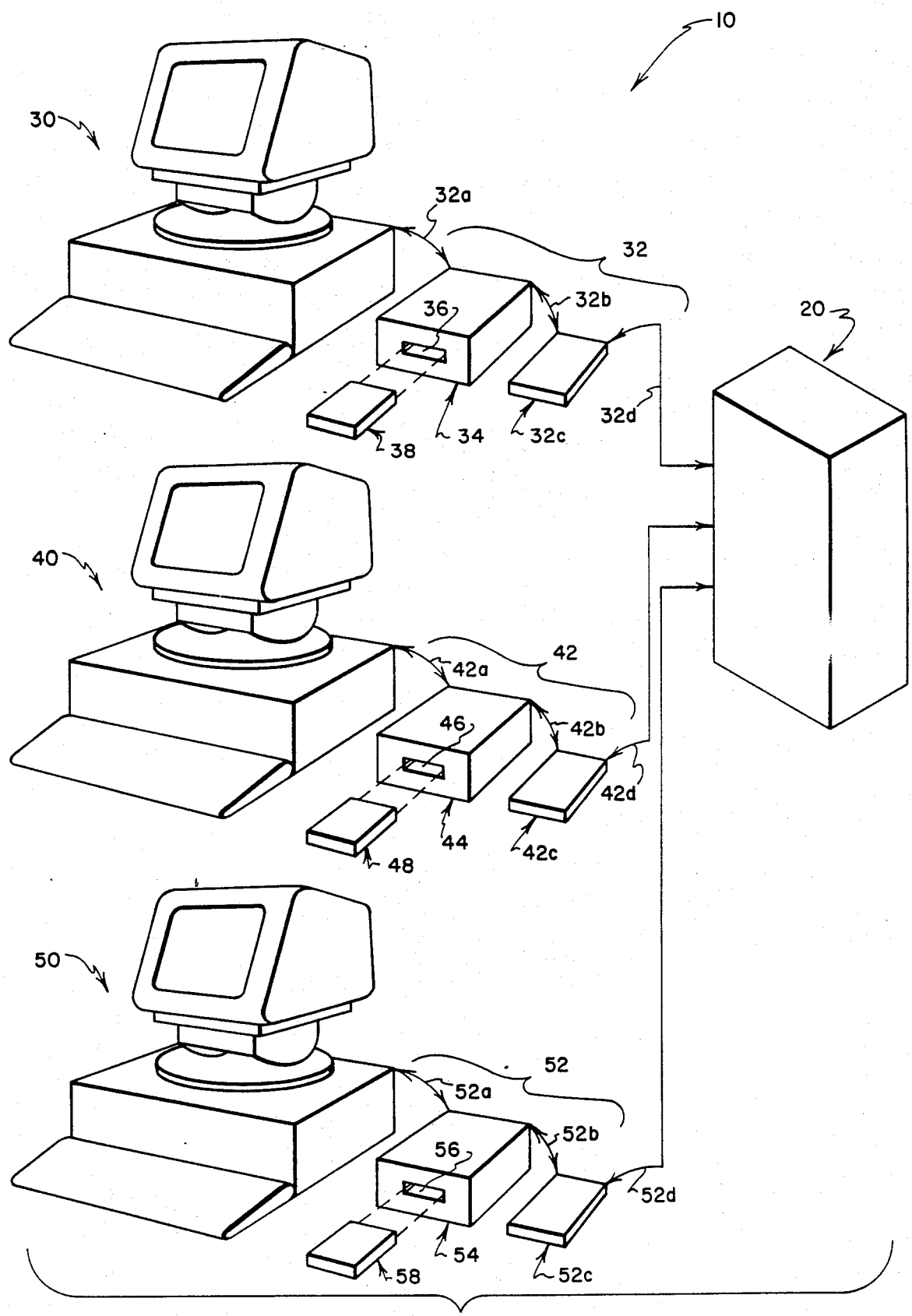
FIG. 1 is a schematic view illustrating features of a computer communications security system that embodies features of the preferred practice of the present invention; and, FIG. 2 is a schematic view, on an enlarged scale, illustrating features of a "security unit" and an "encryption device" that form components of the system of FIG. 1.

Referring to FIG. 1, a communicating computer network system embodying features of the preferred practice of the present invention is indicated generally by the numeral 10. The system 10 includes a host computer 20, a plurality of communicating data terminal equipment units or "terminals" 30, 40, 50, and communication links 32, 42, 52 that are provided for "linking," i.e., transmitting signals between, the host computer 20 and the terminals 30, 40, 50, respectively.

Assigned to and associated with the terminals 30, 40, 50 are devices 34, 44, 54 respectively, each of which is referred to herein by the term "security unit." The security unit 34 is assigned to and associated with the terminal 30, and is interposed between portions 32a, 32b, of the communications link 32. The security unit 44 is assigned to and associated with the terminal 40, and is interposed between portions 42a, 42b of the communications link 42. The security unit 54 is assigned to and associated with the terminal 50, and is interposed between portions 52a, 52b of the communications link 52.

The security units 34, 44, 54 define ports 36, 46, 56, respectively. A plurality of user assigned devices 38, 48, 58 are provided, any one of which may be inserted into (i.e., operably connected to) any one of the ports 36, 46, 56. The devices 38, 48, 58 are each referred to herein by the term "encryption device." Each of the user assigned encryption devices 38, 48, 58 is assigned to a separate person, known as an "authorized user," who has been given authority to communicate with the host computer 20 using one or more of the terminals 30, 40, 50. As will be explained in greater detail, each of the encryption devices 38, 48, 58 has a unique character that serves to identify the person unto whom it has been assigned and/or to evince the authority of such person to access the host computer 20. As will also be explained in greater detail, the user assigned encryption devices 38, 48, 58 cooperate with the security units 34, 44, 54 to generate authenticating signals for responding to authentication query signals that are sent by the host computer 20 along the communication links 32, 42, 52 to establish or reestablish the identification and/or authority of the users of the terminals 30, 40, 50.

In the embodiment of FIG. 1, the host computer 20 is designated in box-like fashion, for its particular type is not of consequence to the practice of the present invention; in preferred practice, the host 20 is a mainframe computer that has communications capability so that its facilities and/or data stored therein can be accessed by such data terminal equipment as the terminals 30, 40, 50. While the terminals 30, 40, 50 shown in FIG. 1 are illustrated schematically as comprising simple data terminal equipment installations (i.e., DTE units), it will be understood that the particular type of communicating data terminal equipment units that form the terminals 30, 40, 50 is not of consequence to the practice of the present invention. While the communications links 32, 42, 52 are illustrated schematically in FIG. 1 as including cables 32a, 32b, 42a, 42b, 52a, 52b, and conventional modem units 32c, 42c, 52c that are connected through conventional telephone lines 32d, 42d, 52d to the host 20, it will be understood that hard wired networks or other types of conventional communication links or components thereof may be used in place of or together with the illustrated components of the communication links 32, 42, 52 without consequence to the practice of the present invention.

While the security units 34, 44, 54 are depicted in FIG. 1 in their preferred form as constituting freestanding structures that are separate from their associated terminals 30, 40, 50, it will be understood that the security units 34, 44, 54 can be attached to or incorporated within the structure of the terminals 30, 40, 50. Stated in another way, it is the manner in which the security units 34, 44, 54 function in cooperation with the host computer 20 and in cooperation with the user encryption devices 38, 48, 58 that is of import to the practice of the present invention. Moreover, as will be readily apparent to those skilled in the art, the functions that are executed by the security units 34, 44, 54 can be performed by a wide variety of arrangements of commercially available electrical circuit components, with the arrangements of these components being selected as a matter of choice of the system engineer such that the resulting arrangement of components will perform the intended functions prescribed herein, whereby details of the construction and arrangement of the components of the security units 34, 44, 54 need not be described. By way of but one example, the above-referenced U.S. Pat. No. 4,475,175 to Smith discloses a typical arrangement of commercially available electrical circuit components that can be utilized to monitor signals being transmitted along a communications link, to store signal string sequences, to transmit stored signal string sequences in response to query signals, to compare signal string sequences that have been transmitted along a communications link to check for propriety, and to take action such as terminating a communications link if comparison of a received signal string sequence differs from what is deemed to comprise an authorized value.

In preferred practice, the security units 34, 44, 54 are identical one with another except in that each of the units 34, 44, 54 has a unique serial number assigned to it that is stored in its electronic memory, as will be explained. The ports 36, 46, 56 that are defined by the units 34, 44, 54 are identical so that each can removably receive any one of the user assigned encryption devices 38, 48, 58. While three security units 34, 44, 54 and three encryption devices 38, 48, 58 have been illustrated in FIG. 1, it will be understood that the system 10 can include a lesser or greater number of either of these components; for instance, more than three terminals 30, 40, 50 can be provided, each of which has at least one of the security units of the type indicated by the numerals 34, 44, 54 associated therewith, and more than three authorized users can be designated, each of which has a unique encryption device such as the devices 38, 48, 58 assigned thereto.

In preferred practice, the encryption devices 38, 48, 58 comprise simple electronic information storage units, with their electronic components carried in a suitable protective housing or enclosure. The devices 38, 48, 58 can have the appearance of cartridges, cards, or the like, as the system engineer may so select. Preferably each of the units 38, 48, 58 includes a pair of separate signal storage areas, one for storing a first encryption that is fixed, for example a signal string that is stored in read-only-memory, and another that stores a second, progressively updated encryption, for example a signal string that is stored in non-volatile random access memory. The first and second encryptions may, for example, comprise signal strings that are representative of six digit numbers such as 222,222 and 444,444, respectively. These two encryptions are utilized as will be described to assist one of the security units 34, 44, 54 in generating appropriate authenticating signals for responding to authentication query signals that emanate from the host computer 20. Moreover, since the first encryption is fixed (i.e., cannot be changed) and is unique to its associated encryption device 38, 48, 58, the first encryption can serve as an identifier or serial number for its associated encryption device.

Figure 2:
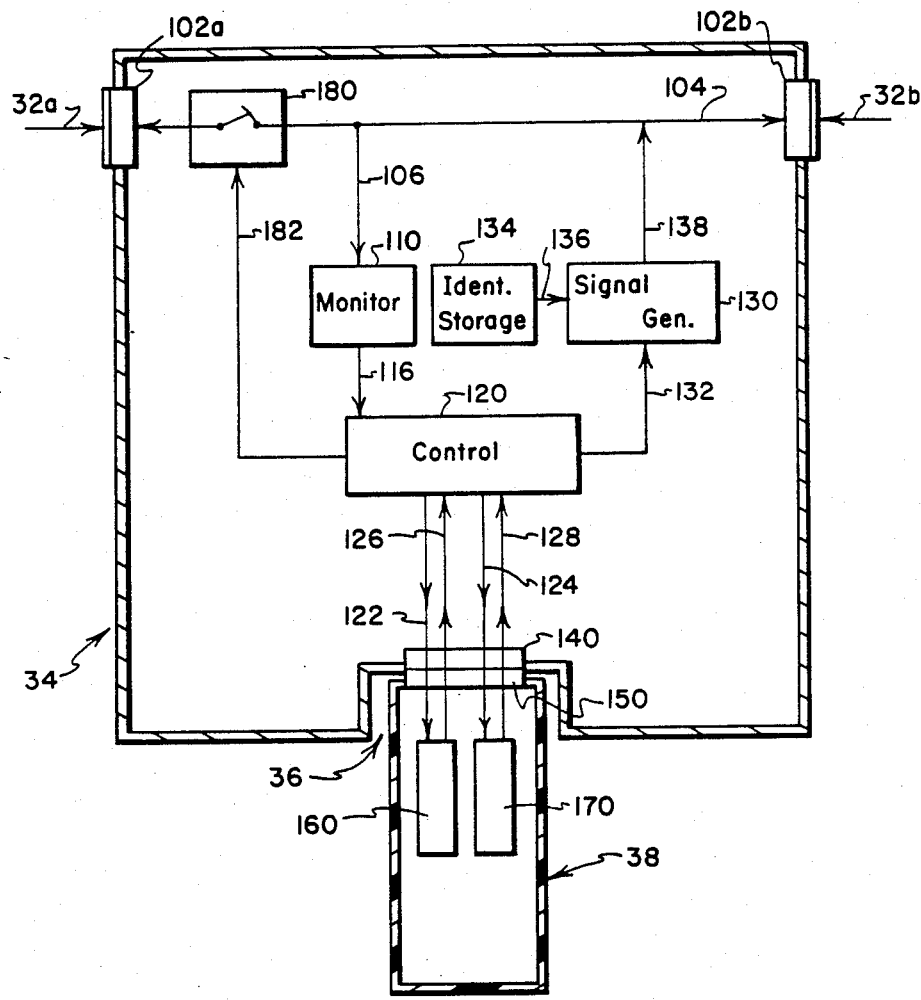

Referring to FIG. 2, the security unit 34 is illustrated schematically as including a pair of electrical connectors 102a, 102b for receiving the cables 32a, 32b, conductors 104 for electrically connecting the connectors 102a, 102b, and a series arrangement of monitoring, control and signalling components designated by the numerals 110, 120, 130, respectively. The control component 120 is coupled to an electrical connector 140 that defines at least a part of the port 36 of the unit 34. The signal generator component 130 is connected to an identification data storage component 134 which serves to electronically store a fixed indication of a unique serial number that has been assigned to the unit 34, for example a signal string that is representative of a six digit number such as 333,333.

As is also illustrated in FIG. 2, the encryption device 38 includes an electrical connector 150 that is configured to mate and electrically connect with the connector 140, and has a pair of memory components that include a read-only-memory component 160 wherein a first encryption is permanently stored, and a non-volatile memory component 170 wherein a second, progressively updated encryption is stored.

In operation, an authorized user who, for example seeks to utilize the terminal 30 for accessing and communicating with the host computer 20, inserts his or her encryption device 38 into the port 36 of the security unit 34 that is associated with the terminal 30. When the encryption unit 38 is properly received by the port 36, electrical connection is established between the electrical connector 140 carried by the security unit 34, and the electrical connector 150 carried by the encryption device 38. Once the encryption device 38 has been inserted into the port 36, the entire interaction of the security unit 34 with the host computer 20 will be totally "transparent" to the user in the senses that the user will need to enter no new passwords nor execute any new log-on sequences, nor will the user observe other types of interactions that take place as a dialog ensues very rapidly between the security unit 34 and the host computer 20 that clears the user's way for access to the host computer 20.

Thus, once the user has inserted his or her encryption device 38 into the port 36 of the security unit 34, with little or no noticeable delay, the terminal 30 can be used in a normal way to initiate the desired type of application interaction with the host computer 20. During the dialog that takes place between the security unit 34 and the host computer 20, a program that is resident within the host computer 20 will send one or a series of authentication query signals along the communications link 32 to the security unit 34. The monitoring component 110 within the security unit 34 will detect the transmission of the authentication query signal or signals, as is indicated in FIG. 2 by the arrow 106. Upon detection of an authentication query signal, the monitor component 110 will signal the control component 120, as is indicated in FIG. 2 by the arrow 116, to cause the control component 120 to operate the signal generator component 130 so that one or a dialoged sequence of authenticating response signals is delivered to the conductors 104, i.e., to the communications link 32, as is indicated in FIG. 2 by the arrow 138.

In preferred practice, the control component 120 operates in response to receipt of the signal 116 from the monitor component 110 to communicate through the electrical connectors 140, 150 with the encryption device 38, as is indicated by arrows 122, 124 in FIG. 2, to read the first and second encryptions that are stored in the sectors 160, 170, respectively, of the encryption device 38. Arrows 126, 128 schematically indicate the transference of readings of the first and second encryptions to the control component 120 from the encryption device 38.

The control component 120 utilizes the first and second encryptions that are read from the encryption device 38 to calculate a portion of a suitable authenticating response signal string, and sends this portion of the authenticating signal string to the signal generating component 130, as is indicated in FIG. 2 by the arrow 132. The control component 120 also sends to the signal generating component 130 a further portion of the authenticating signal string that represents the serial number that has been assigned to the user encryption device 38 (the first encryption that is stored in the memory sector 160 of the device 38 serves well as such a serial number) to the signal generating component 130, as is indicated in FIG. 2 by the arrow 132. By way of example, if the first and second encryptions that are stored within the memory sectors 160, 170 each comprise signal strings that represent six digit numbers such as 222,222 and 444,444, the type of calculation that might be made by the control component 120 to generate the signal portion 132 could be a simple addition of the two values of the two encryptions 222,222 and 444,444 to generate a six or seven digit number, in this case 666,666, that, followed by the serial number of the device 38 (in this case, lets use the first encryption 222,222 as the serial number) to form the complete signal string portion 132 (i.e., a signal string that is representative of the number 666,666,222,222).

The signal generating unit 130 combines the signal 132 that has been received from the control component 120 with a signal portion 136 that is read from the storage component 134 as indicated by the arrow 136 and that is unique to the security unit 34 (e.g., a six digit serial number such as 333,333). The combined resulting authenticating response signal 138 that is delivered to the communications link 32 via the conductors 104 accordingly has a first portion that is representative of a calculation that was made using the encryptions from the memory of the encryption device 38 (in this example, 666,666) a second portion that is representative of the identification of the encryption device 38 (in this example 222,222), and a third portion that is representative of the identification of the security unit 34 (in this case 333,333), whereby the total authenticating response signal string 138 that is sent to the conductors 104, i.e., transmitted along the communications link 32 to the host computer 20 (in this case a signal string that is representative of the number 666,666,222,222,333,333) serves to advise the host computer 20 of the fact that an appropriate user encryption device 38 is in place at the terminal 30 and that access to the host computer 20 should therefore be permitted.

Each time the control component 120 reads the contents of the non-volatile memory component 170 of the encryption device 38 and uses the information therefrom in a calculation to generate above-described calculated component of the signal portion 132, the control component 120 also serves to update the second encryption that is stored within the non-volatile memory component 170 of the encryption device 38 so that, the next time that the second encryption is read from the non-volatile memory component 170 for use in calculating a signal portion 132, the character of the calculated signal portion 132 will differ from the previously calculated signal portion 132. This updating can be done automatically or can be done in response to a command signal that is detected by the monitor component 110 as a part of the dialog that takes place between the security unit 34 and the host computer 20. The manner in which the encryption within the non-volatile memory component 170 is caused to be changed between consecutive readings thereof is a matter of the discretion of the system engineer who may choose to use an algorithm that takes into account any of a wide variety of factors including the time of day when the calculation is made, the date when the calculation is made, the character of a portion of the authentication query signal dialog that has been sent from the host computer, etc.

In preferred practice, the manner in which the encryption within the non-volatile memory component 170 is updated between successive readings preferably takes into account one or more of the previously mentioned date, time and query signal factors together with the character of the encryption that is stored within the read only memory portion 160 of the encryption device 38. By way of but one simple example, if the first encryption stored in the read only memory component 160 is representative of a six digit number such as 222,222, and if the encryption that is temporarily stored in the non-volatile memory portion 170 of the device 38 is also a six digit number such as 444,444, updating the encryption within the non-volatile memory component 170 between consecutive readings thereof can be achieved by taking the six digit reading 444,444 of the encryption from the non-volatile memory 170, adding to it the six digit encryption 222,222 from the read only memory component 160, adding to the result therefrom a six digit number such as 122584 that is representative of the month, day and year of the encryption calculation (whereby in this example a final result in the form of the number 789,250 is achieved), and dropping from this resulting number any digits that exceed six in number (while there are no such excess digits in the example given here, if the calculated new encryption exceeded 999,999 in magnitude, any digits representing millions or larger quantities would simply be dropped), the resulting six digit updated encryption (in this example 789,250) would then be transferred by the control component 120 to the non-volatile memory component 170 for storage and future use.

Just as a new calculation is made by the control component 120 operating in conjunction with the encryption device 38 to provide an updated encryption within the non-volatile memory component 170, the host computer 20, knowing all of the same information that is used by the control component 120 to make its updated calculation, can make a similar updated calculation whereby, when a new query signal is sent from the host computer to the control unit 34, the host computer will know, in advance, the character of the authenticating response signal it anticipates receiving from a user device 38 of a particular serial number. By virtue of the character of these calculations being made entirely independently by the control component 120 and by the host computer 20, the manner in which the calculation of a new authenticating response signal is made is not disclosed by the nature of any of the signals that are sent along the communications link 32. Accordingly, even if an unauthorized user succeeds in monitoring the character of the signals that are sent along the communications link 32, the unauthorized user will not be able to determine the character of the calculation that is made to generate the type of continually updated authenticating response signals that are sent by the security unit 34 in response to authentication query signals sent from the host computer 20. By programming the host computer 20 so that authentication query signals are sent along the communications link 32 at periodic intervals during communication sessions, a check can continually be made of the presence of an authorized user's encryption device 38 in the port 36 of the security unit 30 so that the host computer 20 will be reassured that such communication as is being maintained with the terminal 30 is being supervised by an authorized user.

If a fault in the communications link 32 should cause an initial attempt to access the host computer 20 to fail, the system components as described above are preferably arranged to automatically perform at least one, and preferably two, additional attempts to identify and/or verify the authorization of the user of the terminal 30. If the user has forgotten to insert his encryption device 38 into the port 36, or has done so improperly, the control component 120 will not be able to interact with the device 38 as has been described, and will preferably generate a signal string portion that will be understood by the host computer 20 as representing a failure of connection with one of the devices 38, 48, 58. If the host computer 20 anticipates receiving an authenticating signal other than the one that is received from the device 38, the security supervisor can either decide to accept the signal that is received, or can require that the authorized user return his encryption device 38 for maintenance or replacement as may be appropriate.

Moreover, by programming the host computer 20 so that it will maintain a log of the communication sessions that are conducted by authorized users and of attempts made by unauthorized users to establish communication with the host computer 20, useful records will be generated which will enable a security manager to determine who has been utilizing the host computer 20, what difficulties (if any) that have been encountered by particular authorized users in establishing and maintaining host computer access, and the character of any attempts made by persons who may have been trying to obtain unauthorized access to the host computer 20.

As will be understood by those skilled in the art, the specific manner in which a dialog is conducted between one of the security units 34, 44, 54 and the host computer 20 to effect identification and authentication verification can be conducted in any of a variety of manners to achieve a desired objective of "transparency" to the user, i.e., of conducting the needed dialog absent any supervision or observation by the user of its operation. One approach that can be utilized is illustrated in FIG. 2 wherein the security unit 34 is provided with a suitable switching component 180 that can be operated by the control component 120, as is indicated by an arrow 182, to cut off communications between the DTE and DCE connectors 102a, 102b so that transmissions between the security unit 34 and the host computer 20 are not monitored on the terminal 30 during the identification and authentication verification dialog. Another approach that can be used either as an alternative or together with the use of a switching component 180 is to utilize non-printable character signals in effecting at least a portion of the dialog signal string interchange, and/or to encrypt portions or all of the dialog so that it is unintelligible even if monitored.

As will also be understood by those skilled in the art, the dialog that takes place between of the security units 34, 44, 54 and the host computer 20 can optionally include more in the way of signal string interchanges than has been described in the very simple and straightforward example given previously. For instance, the signal interchanges may include system specific trigger signals that will identify characteristics of one or more of several linked communications components to the other, and/or confirmation signals that serve to confirm receipt of and/or approval of a transmitted signal string. These optional portions of a signal interchange dialog are included at the discretion and choice of the system engineer.

As will be apparent from the foregoing description, the present invention provides a novel and improved computer communication system for limiting host computer access to authorized users. The system of the invention provides a means of preventing unauthorized access to host computers while providing no obstacle or encumbrance to authorized users who seek to establish host computer access.

Although the invention has been described in its preferred form with a certain degree of particularity, it is understood that the present disclosure of the preferred form has been made only by way of example, and that numerous changes in the details of construction and combination and arrangement of procedures and parts may be made without departing from the spirit and scope of the invention as hereinafter claimed. It is intended that the patent shall cover by suitable expression in the appended claims, whatever features of patentable novelty exist in the invention disclosed.

What is claimed is:

1. Apparatus for verifying the authorization of a user of a terminal for accessing a host computer through a communications link, the apparatus comprising:
 (a) encryption means for being carried by an "authorized user," namely a person who is authorized to use terminal to access a host computer through a communications link that connects the terminal to the host computer, the encryption means including a first encryption that has a value which has been assigned to the authorized user as an indicator of the authorized user's authority to access the host computer and also including a second variable encryption representative of the time of a prior successful authorized access with the host computer;

(b) security means interposed in series between portions of the communications link for monitoring signals as they are transmitted along the communications link, the security means defining port means for receiving the encryption means and for cooperating with the encryption means (1) to detect a predetermined authentication query signal sequence of monitored signals as the authetication query signal sequence is transmitted along the communications link from the host computer and, (2) in response to such detection, to effect transmission of a predetermined authenticating signal sequence along the communications link to the host computer, with the value of the authenticating signal sequence being determined at least in part by the value of the first encryption and of a further encryption resident in said security means and representative of the identity of a predetermined terminal associated therewith so that the predetermined authenticating signal sequence constitutes an indicator of the user's and terminal's authority to access the host computer; and, (c) authorization check means associated with the host computer (1) for generating an authentication query signal sequence that, when detected by the security means, will cause the security means to transmit the autheticating signal sequnce along the communications link to indicate to the authorization check means whether the autorized user's encryption means is received by the port means for cooperating with the security means to cause the authenticating signal sequence to constitute an indication of the user's authority and the particular connected terminal's authority to access the host computer, (2) for permitting host computer access upon receiving said predetermined authenticating signal sequence, and (3) for preventing host computer access upon receiving an autheticating signal sequence that is other than said predetermined autheticating signal sequence.

2. The apparatus of claim 1 wherein the security means includes means for cooperating with the encryption means to assure that each newly detected authetication query signal sequence will result in the transmission of an autheticating signal sequence that has a value which differs from the value of a previously transmitted autheticating signal sequence, with the difference between consecutively transmitted authenticating signal sequences being determined at least in part by the value of the first encryption.

3. The apparatus of claim 1 wherein:
(a) the first encryption includes a first N-bit value that is representative of the value of the first encryption;
(b) the encryption means includes first electrical signal storage means for at least temporarily retaining the first N-bit value therein; and,
(c) the security means and the encryption means cooperate to cause the value of the first encryption to be read and, as a part of effecting transmission of an authenticating signal sequence, to cause the value of the authenticating signal sequence to be determined, at least in part, by the value of the first encryption.

4. The apparatus of claim 3 wherein:
(a) the encryption means includes second electrical signal storage means for at least temporarily retaining a second electrical signal string therein that is representative of the value of a second encryption; and,
(b) the security means and the encryption means cooperate to cause the value of the second encryption to be read and, as a part of effecting transmission of an autheticating signal sequence, to cause the value of the autheticating signal sequence to be determined, at least in part, by the value of the second encryption.

5. The apparatus of claim 4 wherein the security means and the encryption means cooperate to cause the second N-bit value that is stored in the encryption means to be updated to a new value once the value of the second encryption has been so read, with the new value of the second N-bit value being determined, at least in part, by the value of the first encryption.

6. Apparatus for verifying the authorization of a user of communicating data terminal equipment for accessing a host computer through a communications link, the apparatus comprising:

(a) user assigned means for being carried by an "authorized user," namely a person who is authorized to use communicating data terminal equipment to access a host computer through a communications link, the user assigned means defining first encryption means for serving as an indication of the authority of the authorized user to use communicating data terminal equipment to access the host computer through a communications link and second encryption means for indicating the time of a past successful access to the host computer;

(b) terminal assigned means for being connected to communication data terminal equipment that is to be utilized by an authorized user to access a host computer through a communications link, and for being interposed in series between portions of the communications link for monitoring signals that are transmitted along the communications link;

(c) port means connected to the terminal assigned means for receiving the user assigned means and for operably connecting the terminal assigned means thereto such that the user assigned means and the terminal assigned means cooperate to detect and respond to query signals sent along the communications link from the host computer; with the response taking the form of predetermined autheticating signals that are sent along the communications link to the host computer, with the character of the authenticating signals being determined at least in part by the first and second encryption means, whereby the autheticating signals constitute an indicator of the authorized user's authority to access the host computer; and, (d) authorization check means for generating the query signals that, the monitored by the terminal assigned means will cause the terminal assigned means to generate autheticating signals to indicate to the authorization check means whether the user assigned means is received by the port means for cooperating with the terminal assigned means to cause the autheticating signals to constitute an indication of the user's authority to access the host computer, for maintaining continuity of the communications link upon receiving said predetermined autheticating signals, and for terminating communications along the communications link upon receiving autheticating signals that are other than said predetermined signals.

7. The apparatus of claim 6 wherein the terminal assigned means includes control means for cooperating with the user assigned means to assure that each newly detected query signals will result in the sending of autheticating signals that differ from previously transmitted autheticating signals, with the difference between consecutively transmitted autheticating signal means being determined at least in part by the character of the first and second encryption means.

8. The apparatus of claim 6 wherein:
the user assigned means includes first electrical signal storage means comprising the first encryption means for retaining a first multi-bit value therein.

9. The apparatus of claim 8 wherein:
(a) the user assigned means includes second electrical signal storage means comprising the second encryption means for at least temporarily retaining a second multi-bit value therein; and,
(c) the control means is operable to cooperate with the user assigned means such that, in the sending of the authenticating signals, the second multi-bit value of the second encryption means is read, and the character of the authenticating signals are determined at least in part by the content of the second encryption means.

10. The apparatus of claim 9 wherein the terminal assigned means and the user assigned means cooperate to cause the second multi-bit value to be updated to a new value once the second multi-bit value has been read and utilized in determining the character of the autheticating signals.

11. A method of providing a communication link for transmitting signals between a host computer and at least one terminal that is operated by an authorized user, the method comprising the steps of:
(a) providing encryption means for being carried by a person who is authorized to use a terminal to access a host computer through a communications link, with the encryption means including a first encryption having a fixed value that is assigned to the authorized user as an indicator of his authority to access the host computer and also including a second variable encryption representative of the time of a prior successful authorized access with the host computer;
(b) providing security means interposed between portions of the communications link for monitoring signals that are transmitted along the communications link, the security means serving to define port means for receiving the encryption means and to cooperate with the encryption means to detect a predetermined authetication query sequence of monitored signals from the host computer and, in response to such detection, to effect transmission of an authenticating signal sequence along the communications link to the security means, with the value of the authenticating signal sequence being determined at least in-part by the value of said first and second encryptions so that the value of the autheticating signal sequence constitutes an indicator of the user's authority to access the host computer;
(c) providing authorization check means associated with the host computer for transmitting the predetermined authetication query sequence along the communications link that, when monitored by the security means, will cause the security means to transmit the authenticating signal sequence along the communications link;
(d) positioning the encryption means to be received by the port means; and,
(e) conducting a user authorization check by:
  (i) operating the authorization check means to generate the predetermined authentication query signal sequence;
  (ii) operating the security means to detect the predetermined authetication query signal sequence and to cooperate with the encryption means to effect transmission of the autheticating signal sequence; and,
  (iii) operating the authorization check means to maintain continuity of the communications link upon receiving said predetermined authenticating signal sequence, and to terminate communication of signals along the communications link upon receiving an authenticating signal sequence that is other than said predetermined sequence.

12. The method of claim 11 including the steps of conducting communications along the communications link between the host computer and the terminal, with such communications being interrupted at least once to conduct a further user authorization check by:
(a) operating the authorization check means to transmit the predetermined authentication query signal sequence along the communications link;
(b) operating the security means to detect the predetermined authentication query signal sequence and to cooperate with the encryption means to effect transmission of the authenticating signal sequence; and,
(c) operating the authorization check means to maintain continuity of the communications link upon receiving said predetermined authenticating signal sequence, and to terminate communication of signals along the communications link upon receiving an authenticating signal sequence that is other than said predetermined sequence.

13. The method of claim 11 wherein the step of effecting transmission of an autheticating signal sequence includes the step of calculating a new value to be used for the authenticating signal sequence so that no two consecutively used authenticating signal sequences have values that are identical, and so that the calculated difference between the values of consecutively used authenticating signal sequences is controlled, at least in part, by the value of the first and second encryptions.

14. The method of claim 11 additionally including the steps of:
(a) providing within the encryption means first storage means for retaining therein, at least temporarily, at least one multi-bit value; and,
(b) storing in the first storage means a first multi-bit value representing the value of said first encryption.

15. The method of claim 11 additionally including the steps of:
(a) providing within the encryption means second storage means for retaining therein, at least temporarily, a second multi-bit value;
(b) storing in the second storage means a second multi-bit value representing the value of said second encryption; and, (c) the step of effecting transmission of an authenticating signal sequence includes the step of causing the value of the authenticating signal sequence to be determined at least in part by the value of the second encryption.

16. The method of claim 15 additionally including the step of updating the value of the second encryption after each transmission of an autheticating signals sequence.

17. The method of claim 16 wherein the step of updating the value of the second encryption is done in a manner that is influenced by the value of the first encryption.

18. A method of establishing the authority of a user of a station of communications network to use facilities of the communications network, comprising the steps of:
  (a) providing an authorized user with encryption means for carrying (a) a first encryption that has a fixed value which is representative of the authority of the user to utilize at least one station of a communications network to communicate through the network with means defining another station of the network and (b) a second variable encryption value representative of the time of a prior successful authorized access with the host computer;
  (b) providing the at least one station of the communications network with signalling means for reading the value of the first and second encryptions and for transmitting an authenticating electrical signal through the network to the another station, with the autheticating signal having a value that is determined, at least in part, by the value of the first and second encryptions;
  (c) causing the signalling means to read the value of the encryptions and to transmit said authenticating signal as a request by the user to utilize facilities of the communications network;
  (d) receiving the autheticating signal at the another station and comparing the value represented by the authenticating electrical signal with a predetermined value that is predetermined through a calculation that is made at the another station, wherein said calculation takes into account the value of the first and second encryptions; and,
  (e) permitting use of the facilities of the communications network by the user only if the value of the authenticating signal is identical with said predetermined value.

19. The method of claim 18 wherein the step of transmitting the authenticating signal includes the step of assembling the authenticating signal from a plurality of multi-bit components, with one of the multi-bit components including a multi-bit value that is determined, at least in part, by the value of the first encryption.

20. The method of claim 19 wherein another of the multi-bit components that is utilized in assembling the authenticating signal has a value that is assigned to the signalling means as an identifier of the signalling means.

21. The method of claim 19 wherein another of the multi-bit components that is utilized in assembling the authenticating signal has a value that is assigned to the encryption means as an identifier of the encryption means.

22. The method of claim 18 wherein the value of the authenticating signal and the predetermined value are calculated separately and independently at the at least one station and at the another station, respectively, with no indication of the manner in which these values are calculated being transmitted through the communications network, whereby, even if an unauthorized user seeks to obtain access to facilities of the network by monitoring signals that are transmitted through the network, the unauthorized user will not be taught the manner in which the values are calculated.

23. The method of claim 22 wherein the encryption means comprises a pocket-size structure that houses electrical signal storage means, and the step of providing an authorized user with encryption means includes the step of storing a multi-bit signal in the storage means that is indicative of the value which is representative of the authority of the user.

24. The method of claim 23 additionally including the steps of:
  (a) storing in the electrical signal storage means a second multi-bit signal that is representative of a value of said second encryption; and,
  (b) the step of causing the signalling means to transmit said authenticating signal includes the step of causing the value of the authenticating signal to be determined, at least in part, by the value of the second encryption.

25. The method of claim 24 additionally including the step of updating the value of the second encryption after each transmission of an authenticating signal sequence.

26. The method of claim 25 wherein the step of updating the value of the second encryption is done in a manner that is influenced by the value of the first encryption.

27. An interactive computer communications security system for serial disposition within a communication link between a host computer and a remote user terminal, said security system comprising:
  a portable user-carried device including (i) data storage means for storing machine readable data having a first fixed data portion representative of an assigned user's identity and a second variable data portion which is changed to represent the time of successful prior communication link usage and (ii) first signal coupling means for coupling signals representative of said first and second data portions from said user-carried device; and
  terminal control means for serial disposition in said communication link and having second signal coupling means mated with said first signal coupling means for passing onto said communication link authentication signals which are representative of said first and second data portions of the user-carried device.

28. An interactive method for effecting user security within a multi-user communication link between a host computer site and plural remote user terminal sites said method comprising the steps of:
  maintaining a user-carried device which includes stored machine readable data having a first fixed data portion representative of an assigned user's identity and a second variable data portion which is changed to represent the time of successful prior communication link usage and which collectively is processed to provide unique authenticating data;
  maintaining at said host computer corresponding authenticating data;
  accessing and using said stored data at a remote user terminal to generate and transmit said unique authenticating data to said host computer site over said link when the corresponding user desires use of said link; and
  permitting use of said link only if the authenticating data received at the host computer site corresponds to the authenticating data maintained thereat.

* * * * *